June 17, 1958 R. KAISER 2,839,074
VALVES
Filed April 17, 1956 2 Sheets-Sheet 1
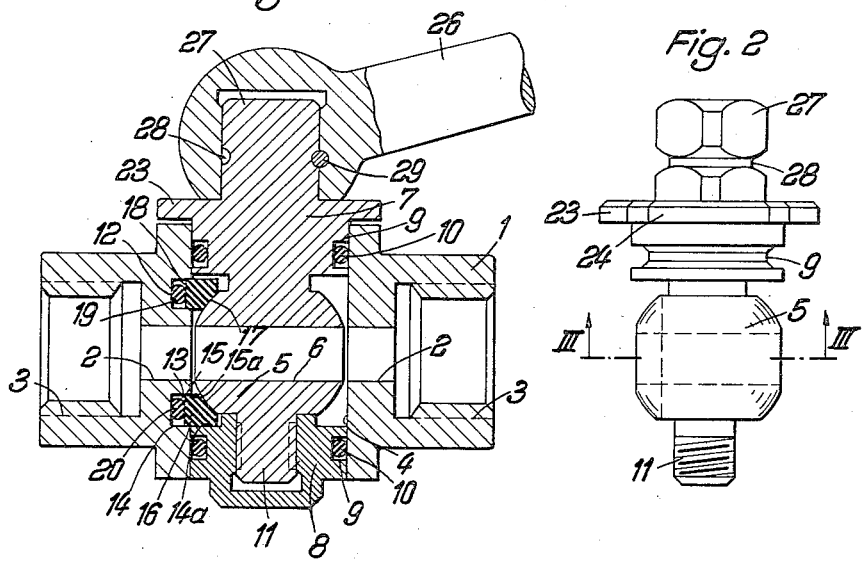
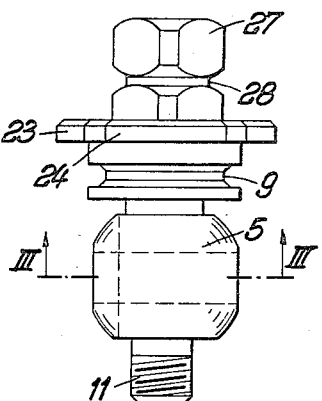
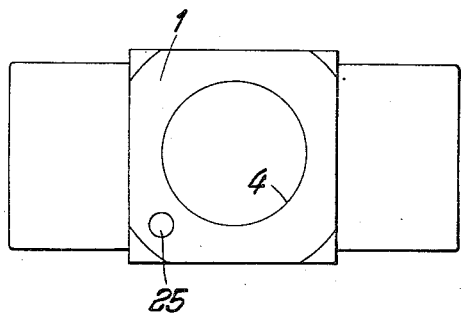
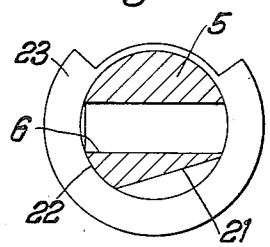
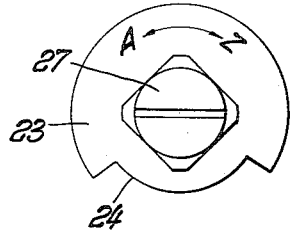
Inventor:
Rudolf Kaiser
By: Michael S. Striker
agt.

June 17, 1958 R. KAISER 2,839,074
VALVES
Filed April 17, 1956 2 Sheets-Sheet 2
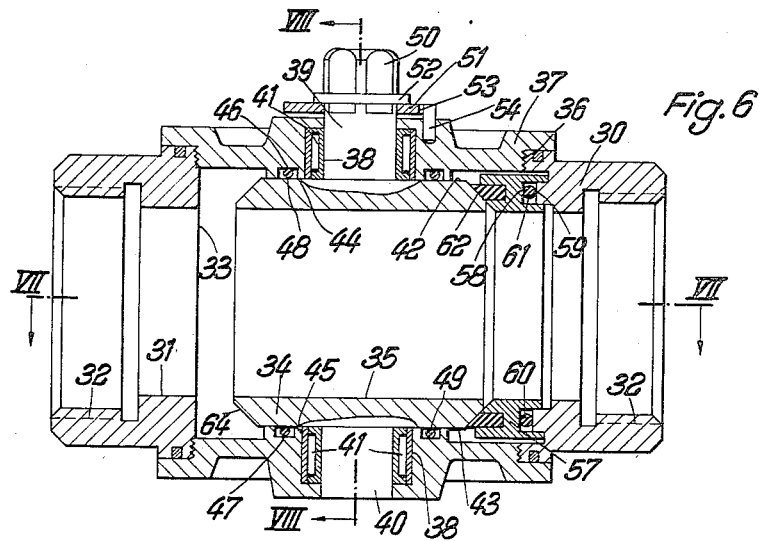
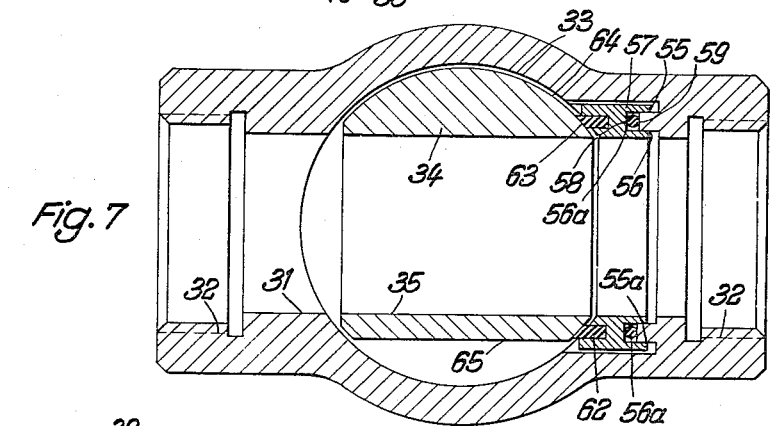
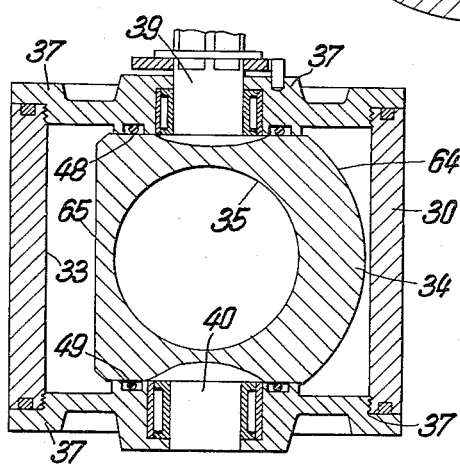
Inventor:
Rudolf Kaiser
By: Michael S. Striker
att.

United States Patent Office 2,839,074
Patented June 17, 1958

2,839,074

VALVES

Rudolf Kaiser, Ettlingen, Baden, Germany

Application April 17, 1956, Serial No. 578,755

Claims priority, application Germany April 19, 1955

18 Claims. (Cl. 137—315)

The present invention relates to valves.

More particularly the present invention relates to valves wherein a turnable valve member has usually a spherical portion formed with a passage which is aligned with the direction of fluid flow when the valve member is open and which extends across the direction of flow when the valve member is closed.

With valves of this type the valve housing is generally made of at least two parts so that it is possible to assemble the housing about the turnable valve member. This manufacture of the housing in a number of parts involves great difficulties both as to the manufacture and assembly of the parts as well as with the proper accuracy of the parts so that they will fit together properly to provide the desired seal. Furthermore, with known valves of the above type it is conventional to provide a pair of axially spaced sealing means which engage the turnable valve member so as to provide a seal irrespective of the direction of fluid flow.

One of the objects of the present invention is to provide a valve of the above type which has a one-piece valve housing and which at the same time enables the turnable valve member to be very easily assembled and disassembled from the valve.

Another object of the present invention is to provide a valve of the above type with a single sealing means on one side of the axis of the turnable valve member and capable of providing a proper seal irrespective of the direction of fluid flow through the valve.

A further object of the present invention is to provide a valve structure capable of accomplishing the above objects and at the same time being suitable for relatively large valves as well as valves which operate at relatively high pressures.

An additional object of the present invention is to provide a valve structure capable of accomplishing all of the above objects and at the same time composed of simple and ruggedly constructed elements which are very reliable in operation.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a longitudinal sectional view of one possible valve structure according to the present invention;

Fig. 2 is an elevational view of the valve member of Fig. 1;

Fig. 3 is a transverse sectional view of the valve member of Fig. 2 taken along line III—III of Fig. 2 in the direction of the arrows;

Fig. 4 is a top plan view of the valve member of Fig. 2;

Fig. 5 is a top plan view of the valve housing of Fig. 1 with the valve member removed therefrom;

Fig. 6 is a longitudinal sectional view of another embodiment of a valve according to the present invention;

Fig. 7 is a sectional plan view taken along line VII—VII of Fig. 6 in the direction of the arrows; and Fig. 8 is a transverse sectional view of the valve structure of Fig. 6 taken along line VIII—VIII of Fig. 6 in the direction of the arrows.

Referring now to the drawings and to Figs. 1–5 in particular, it will be seen that the embodiment of the invention illustrated in Figs. 1–5 includes an elongated, one-piece valve housing 1 which is formed with a longitudinal bore 2 through which a fluid is adapted to flow, this bore 2 being of an enlarged diameter at its end portions 3 which are threaded to receive four conduits respectively leading the fluid to and from the valve housing 1. This valve housing 1 is formed with a transverse bore 4 which extends normally with respect to the longitudinal bore 2 through the housing 1 and which is cylindrical, of a constant diameter, and provided with a smooth face. A valve member 5 is turnable within the transverse bore 4 of the housing 1, and this valve member 5 is formed with a passage 6 which extends through the valve member 5 and which is aligned with the bore 2 when the valve member 5 is in its open position which is illustrated in Fig. 1. When the valve member 5 is turned to its closed position the passage 6 extends across the longitudinal bore 2. The valve member 5 is provided with a pair of cylindrical portions 7 and 8 which engage the inner face of the transverse bore 4 so as to guide the valve member 5 for turning movement about the axis of the transverse bore 4.

In order to provide a sealed sliding engagement between the valve member 5 and the valve housing 1, the cylindrical portions 7 and 8 of the valve member 5 are formed with annular grooves 9 which receive the annular sealing rings 10, as shown in Fig. 1, although it is also possible to provide the grooves 9 in the valve housing 1 and communicating with the transverse bore 4 so that sealing rings 10 in such annular grooves will engage the cylindrical portions 7 and 8 to provide a sealed sliding engagement between the valve member 5 and the valve housing 1. The cylindrical portion 8 of the valve member 5 is removably connected to the valve member 5 as by being threaded onto the threaded portion 11 of the valve member 5 which is shown in Figs. 1 and 2. The lower end portion of the cylindrical bottom end 8 of the valve member 5 has a hexagonal configuration so that this cylindrical portion 8 may be conveniently removed from and connected to the remainder of the valve member 5.

On one side of its axis, the transverse bore 4 communicates with an annular groove 13 formed in the valve housing 1 and surrounding and being coaxial with the longitudinal bore 2. This groove 13 has an outer annular face 14 and an inner annular face 15, these annular faces 14 and 15 being coaxial with each other and forming cylindrical guiding surfaces for the purpose described below. The annular guiding surfaces 14 and 15 are interconnected by an annular surface 12 which is located in a plane normal to the axis of the longitudinal bore 2.

A sealing ring 16 in the form of an annular piston extends into the groove 13 and is in slidable engagement with the inner and outer annular guide surfaces thereof. Thus, the inner and outer cylindrical surfaces 14a and 15a of the sealing ring 16 are respectively in sliding engagement with the cylindrical guide surfaces 14 and 15. In this manner the sealing ring 16 is guided for axial movement in a direction parallel to the longitudinal bore 2, and at its face which is directed toward the valve member 5, the sealing ring 16 is provided with an annular surface 17 which is concave and which forms part of a sphere. This surface 17 engages a convexly curved outer surface portion of the valve member 5 which also forms part of a sphere of the same diameter as the sphere of which the surface 17 forms a part. The sealing ring 16 also includes an annular surface 18 interconnecting its inner and outer cylindrical surfaces and located in a plane normal to the axis of the longitudinal bore 2, this surface 18 being spaced from the surface 12 so as to define therewith a hollow annular chamber 19 which remains within the groove 13, this chamber 19 having a radial width which is greater than its axial length. Within this hollow chamber 19 is located a sealing ring 20 of circular cross section and made of a compressible elastic material such as rubber or the like, for example. The circular cross section of the sealing ring 20 is greater, in the unstressed condition of the sealing ring 20, than the distance between the surfaces 12 and 18 so that in the assembled condition of the valve which is illustrated in Fig. 1 the sealing ring 20 is compressed and urges the sealing ring 16 into engagement with the valve member 5. The sealing ring 20 in its unstressed condition extends along a circle whose diameter is substantially midway between the diameter of the surfaces 14 and 15 so that when the parts are assembled the sealing ring 20 does not engage either of the surfaces 14 and 15.

With this arrangement of the parts the sealing ring 16 is urged toward the valve member 5 not only by the pressure of the compressed ring 20, but also by the pressure of the fluid which enters into the hollow chamber 19 and presses against the surface 18 of the sealing ring 16. When fluid under pressure enters into the hollow chamber 19 by movement along the inner cylindrical guide surface 15 thereof, this fluid under pressure tends to increase the diameter of the sealing ring 20 and thus seals the engagement between member 16 and surface 14. On the other hand, if fluid under high pressure enters into the chamber 19 along the outer annular face 14 thereof, then the fluid under pressure tends to reduce the size of the sealing ring 20 and the engagement between sealing ring 16 and guide surface 15 is sealed. In this manner the engagement between the valve member 5 and the sealing ring 16 is sealed by the fluid under pressure irrespective of the direction in which it is flowing, and thus independently of the direction of pressure drop. Thus, it is possible to provide a seal for both directions of flow with but a single sealing ring located on one side of the axis of the transverse bore 4.

In order to be able to remove the valve member 5 from the one-piece valve housing 1, this valve member 5 is provided next to its spherical, convex outer surface portion with a surface portion 21 of substantially less curvature than the convex surface portion 22 shown in Fig. 3, this convex surface portion 22 forming part of a sphere and cooperating with the sealing ring 16. In the illustrated example the surface portion 21 is flat and located in a plane which makes an acute angle with the axis of passage 6, as indicated in Fig. 3. It will be noted that this angular arrangement of the flat surface portion 21 leaves a sufficiently large outer surface portion 22 to engage the sealing ring 16 when the valve 5 is turned between its open position which is shown in Fig. 3 and its closed position which is 90° counterclockwise from the position indicated in Fig. 3. Thus, in its open and closed positions the sealing ring 16 will remain in engagement with the spherical surface 22, and Fig. 4 shows the letters A and Z which indicate the open and closed positions of the valve member. If the valve member 5 is turned beyond its open and closed positions to a third position where the flat surface portion 21 of the valve member 5 is directed toward and located opposite the sealing ring 16, then the valve member 5 may be removed from the housing 1 by being moved upwardly with respect to the latter, as viewed in Fig. 1, after the bottom cylindrical portion 8 of the valve member 5 is removed therefrom.

The cylindrical portion 7 of the valve member 5 is formed integrally therewith and has an upper portion extending upwardly beyond the housing 1 and forming a shaft portion which may be turned in order to open and close the valve. Just above the cylindrical portion 7 which is located within the transverse bore 4, the valve member 5 includes an outwardly extending flange 23 which is provided with an arcuate cutout 24 (Figs. 2–4), and a stop pin 25 is removably fixed to the housing 1 and extends into the arcuate cutout 24 which is formed at the periphery of the annular flange 23, this stop pin 25 being shown in Fig. 5. Thus, the stop pin 25 will cooperate with the ends of the arcuate cutout 24 in order to limit the turning movement of the valve member 5 to an angle which permits the valve member 5 to be turned only between its open and closed positions. Thus, the flange 23 with its cutout 24 and stop pin 25 form a stop means for limiting the turning movement of the valve member 5. In order to remove the valve member 5, the stop pin 25 must be removed from the housing 1, and this may be accomplished by threading the stop pin 25 into a threaded bore formed in the housing 1, so that it is a simple matter to remove the stop pin 25 whenever desired. After removing the stop pin 25 the valve member 5 may be turned to the position where the flat surface portion 21 thereof is located opposite and directed toward the sealing ring 16, so that the valve member 5 may now be removed.

The upper end portion 27 of the valve 5 has a square cross section and receives a handle 26 formed with a bore of square cross section into which the portion 27 extends so that the handle 26 may be used to turn the valve member 5. The portion 27 is formed with an annular groove 28, and a pin 29 extends through a bore of the handle 26 and into the groove 28 so that with the pin 29 in position the handle 26 cannot be removed from the valve member 5.

Referring now to Figs. 6–8, an embodiment of the invention is illustrated therein which is particularly suitable for valves of large size. This embodiment of the invention includes an elongated valve housing 1 which is formed with a longitudinal bore 31 through which the fluid is adapted to flow, this bore 31 having enlarged ends 32 which are threaded to receive conduits for leading the fluid to and from the valve housing 30. This valve housing 30 is formed with a transverse cylindrical bore 33 which serves to receive the turnable valve member 34 which is formed with a passage 35 extending therethrough and being aligned with the longitudinal bore 31 when the valve member 34 is in its open position, this passage 35 extending across the longitudinal bore 31 when the valve member 34 is in its closed position. The transverse bore 33 is closed at its opposite ends by a pair of annular cover members 37 which are threadedly connected to the valve housing 30. Both of the cover members 37 are provided with central bores 38 which serve as bearings for the valve member 34, these bearings 38 receiving the cylindrical projections 39 and 40 of the valve member 34 which are respectively located on opposite sides of the passage 35 thereof and which are coaxial with the transverse bore 33. The central bores 38 of the covers 37 receive roller bearings 41 which are of an extremely small size and may preferably be in the form of needle bearings. In planes which are normal to its turning axis the valve member 34 is provided with a pair of flat annular circular faces 42 and 43 respectively surrounding the cylindrical projections 39 and 40 and slidably engaging the inner annular faces 44 and 45 of the covers 37 in a fluid-tight manner. The inner annular sealing faces 44 and 45 of the cover members 37 are respectively formed with annular grooves 46 and 47 which respectively receive sealing rings 48 and 49 which engage the annular faces 42 and 43 of the valve member to provide a fluid-tight engagement therewith, although, if desired, these grooves may be formed in the faces 42 and 43 and the sealing rings therein may engage the faces 44 and 45 of the annular cover members 37. In this way a fluid-tight engagement between the valve housing and turnable valve member is provided. The cylindrical projection 39 is provided at its upper end portion with a part 50 of square cross section for receiving a handle for turning the valve member 34 between its open and closed positions. A ring 51 which is formed with an arcuate cutout is located on the portion 50 of the cylindrical projection 39 and is held in position by a snap ring 52 which extends into an annular groove formed in the portion 50 of the cylindrical projection 39. A stop pin 54 is removably connected to the valve housing 30 as by being threaded into a threaded bore thereof or as by having a fairly snug fit in a bore of the housing 30, and this stop pin 54 extends into the arcuate cutout of the stop disc 51 which has a central square opening mating with the square projection 50 so that the disk 51 cannot turn with respect to the cylindrical projection 38. In this manner the valve member 34 is limited to an angular movement which permits it to move only between its open and closed positions.

On one side of the axis of the transverse bore 33 the housing 30 is formed with a pair of annular cylindrical guide surfaces 55 and 56 which are coaxial with the longitudinal bore 31, the guide surface 55 surrounding the guide surface 56. A sealing ring 57 is formed with a groove having inner and outer annular guide surfaces 56a and 55a which respectively are in slidable engagement with the guide surfaces 56 and 55 so that in this way the sealing ring 57 forms an annular piston which is guided for axial movement in a direction parallel to the axis of the longitudinal bore 31. The surfaces 55a and 56a are interconnected by an annular surface 58 located in a plane normal to the axis of the longitudinal bore 31, and the surfaces 55 and 56 are interconnected by an annular surface 59 which is located in a plane normal to the axis of the bore 31, these surfaces 58 and 59 being spaced from each other and defining between themselves the annular hollow chamber 60 in which the circular sealing ring 61 of circular cross section is located in engagement with and compressed between the surfaces 58 and 59. The sealing ring 57 carries a sealing member 62 which extends beyond the sealing ring 57 and which has a circular face portion 63 forming part of a sphere and slidably engaging a spherical outer surface portion 64 of the valve member 34, this sealing member 62 being made of a wear-resistant plastic or the like. The sealing ring 57 operates in the same manner as the ring 16 of the embodiment of Figs. 1–5. Thus, the compressed ring 61 urges the sealing member 62 into engagement with the valve member 34 and depending upon the direction of fluid flow the fluid under pressure will enter into the hollow chamber 60 in order to cause the size of the sealing ring 61 to be increased or decreased to automatically provide the proper seal depending upon the direction of flow, the sealing ring 61 having in its unstressed condition a cross section of a diameter greater than the distance between the surfaces 58 and 59 and this sealing ring 61 in its unstressed condition extending along a circle whose diameter is substantially midway between the diameters of the coaxial annular guide surfaces 55 and 56.

As is apparent from Figs. 7 and 8, the valve member 34 is provided with a flat surface portion 65 in addition to its spherical surface portion 64. As may be seen from Fig. 7 where the valve member 34 is shown in its open position, the spherical surface portion 64 is great enough to enable the valve member 34 to be turned from the open position shown in Fig. 7 in a clockwise direction through 90° to a closed position. On the other hand, when the valve member 34 is turned through 90° in a counterclockwise direction, as viewed in Fig. 7, the flat surface portion 65 is located opposite and directed toward the sealing ring 57, and in this position of the valve member it may be removed from the housing 30 after the upper cover member 37, as view in Fig. 6, is removed. The upper cover member 37 of Fig. 6 which is screwed to the housing 30 at 36 may be removed from the housing 30 after removal of the stop pin 54. This stop pin 54 cooperates with the arcuate cutout of the stop disk 51 to limit the turning movement of the valve member 34 between the open position shown in Fig. 7 and a closed position located 90° in a clockwise direction from the position shown in Fig. 7. When the stop pin 54 is removed the valve member 34 may be turned in a counterclockwise direction through 90° from the position shown in Fig. 7 so that the flat surface 65 is directed toward the sealing ring 57, and then after the cover member 37 is removed the valve member may be raised upwardly out of the housing 30. The length of the arcuate cutout 53 is such that when the stop pin 54 engages the ends of this arcuate cutout the valve member 34 will be located in its open and closed positions, respectively.

It will be understood that each of the elements described above, or two or more together, may also find a useful application in other types of valves differing from the types described above.

While the invention has been illustrated and described as embodied in valves with one-piece valve housings, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A valve comprising, in combination, an elongated valve housing formed with a longitudinal bore through which a fluid is adapted to flow and formed with a transverse bore extending through said valve housing transversely across said longitudinal bore; annular sealing means located in said housing on one side of the axis of said transverse bore in a position surrounding and coaxial with said longitudinal bore of said housing; and an elongated valve member turnable in said transverse bore of said housing about a transverse turning axis, said valve member being formed with a passage which is aligned with said longitudinal bore when said valve member is in an open position and which extends across said longitudinal bore when said valve member is turned about said transverse turning axis to a closed position, said valve member having an outer convexly curved surface portion engaging said sealing means when said valve member is in said open and closed positions, and said valve member having a face portion of substantially less curvature than said convexly curved portion thereof directed toward said sealing means when said valve member is turned about said transverse turning axis to a third position located beyond said open and closed positions thereof, so that when said valve member is in said third position thereof it may be removed from said housing in the direction of said transverse turning axis.

2. A valve comprising, in combination, an elongated one-piece housing formed with a longitudinal bore through which a fluid is adapted to flow, said housing also being formed with a transverse bore extending through said housing across said longitudinal bore thereof; annular sealing means located in said housing in said transverse bore thereof on one side of the axis of said transverse bore in a position surrounding and substantially coaxial with said longitudinal bore; and an elongated valve member turnable in said transverse bore of said housing about a transverse turning axis, said valve member having a convexly curved surface portion engaging said sealing means, said valve member being formed with a passage which is aligned with said longitudinal bore when said valve member is in an open position and which extends across said longitudinal bore when said valve member is turned about said transverse turning axis to a closed position, said convexly curved surface of said valve member engaging said sealing means when said valve member is in said open and closed positions thereof, said valve member having a surface portion of substantially less curvature than said convexly curved surface thereof directed toward said sealing means when said valve member is turned about said transverse turning axis to a third position located beyond said opened and closed positions thereof so that when said valve member is in said third position said valve member may be removed from said housing in the direction of said transverse turning axis.

3. A valve comprising, in combination, an elongated one-piece housing formed with a longitudinal bore through which a fluid is adapted to flow and formed with a transverse bore extending through said housing across said longitudinal bore thereof; annular sealing means located in said transverse bore of said housing on one side of the axis of said transverse bore and in a position surrounding and substantially coaxial with said longitudinal bore; and a valve member turnable in said transverse bore of said housing about a transverse turning axis, said valve member having a passage extending therethrough and aligned with said longitudinal bore when said valve member is in an open position and extending across said longitudinal bore when said valve member is turned about said transverse turning axis to a closed position, said valve member having a first outer surface portion which forms part of a sphere and which is convexly curved and engages said sealing means when said valve member is in said open and closed positions thereof, and said valve member having a second outer surface portion of substantially less curvature than said first surface portion and located opposite and directed toward said sealing means when said valve member is turned about said transverse turning axis to a third position located beyond said opened and closed positions thereof, so that said valve member may be removed from said housing in the direction of said transverse turning axis when said valve member is in said third position thereof.

4. A valve comprising, in combination, an elongated housing formed with a longitudinal bore through which a fluid is adapted to flow and formed with a transverse bore extending through said housing and across said longitudinal bore; annular sealing means located in said transverse bore of said housing on one side of the axis of said transverse bore and in a position surrounding and substantially coaxial with said longitudinal bore; and a valve member turnable in said transverse bore of said housing about a transverse turning axis, said valve member having a passage aligned with said longitudinal bore when said valve member is in an open position and extending across said longitudinal bore when said valve member is turned about said transverse turning axis to a closed position, said valve member having an outer convexly curved surface portion forming part of a sphere and engaging said sealing means when said valve member is in said open and closed positions thereof, and said valve member having a flat surface portion directed toward said sealing means when said valve member is turned about said transverse turning axis to a third position located beyond said open and closed positions thereof so that said valve member may be removed from said housing in the direction of said transverse turning axis when said valve member is in said third position thereof.

5. A valve comprising, in combination, an elongated housing formed with a longitudinal bore through which a fluid is adapted to flow and formed with a transverse bore extending through said housing and across said longitudinal bore; annular sealing means located in said transverse bore of said housing on one side of the axis of said transverse bore and in a position surrounding and substantially coaxial with said longitudinal bore; a valve member turnable in said transverse bore of said housing about a transverse turning axis, said valve member having a passage aligned with said longitudinal bore when said valve member is in an open position and extending across said longitudinal bore when said valve member is turned about said transverse turning axis to a closed position, said valve member having an outer convexly curved surface portion forming part of a sphere and engaging said sealing means when said valve member is in said open and closed positions thereof, and said valve member having a flat surface portion directed toward said sealing means when said valve member is turned about said transverse turning axis to a third position located beyond said open and closed positions thereof so that said valve member may be removed from said housing in the direction of said transverse turning axis when said valve member is in said third position thereof, said valve member having a pair of cylindrical portions coaxial with said transverse bore and respectively located on opposite sides of said passage of said valve member; and sealing means engaging said cylindrical portions of said valve member for sealing the valve member in said transverse bore of said housing.

6. A valve comprising, in combination, an elongated housing formed with a longitudinal bore through which a fluid is adapted to flow and formed with a transverse bore extending through said housing and across said longitudinal bore; annular sealing means located in said transverse bore of said housing on one side of the axis of said transverse bore and in a position surrounding and substantially coaxial with said longitudinal bore; a valve member turnable in said transverse bore of said housing about a transverse turning axis, said valve member having a passage aligned with said longitudinal bore when said valve member is in an open position and extending across said longitudinal bore when said valve member is turned about said transverse turning axis to a closed position, said valve member having an outer convexly curved surface portion forming part of a sphere and engaging said sealing means when said valve member is in said open and closed positions thereof, and said valve member having a flat surface portion directed toward said sealing means when said valve member is turned about said transverse turning axis to a third position located beyond said open and closed positions thereof so that said valve member may be removed from said housing in the direction of said transverse turning axis when said valve member is in said third position thereof, said valve member having on opposite sides of said passage thereof, respectively, a pair of cylindrical projections coaxial with said transverse bore and slidably engaging said housing in said transverse bore, one of said projections being removably connected to said valve member; and sealing means engaging said cylindrical projections for providing a sealed slidable engagement between said valve member and housing.

7. A valve comprising, in combination, an elongated housing formed with a longitudinal bore through which a fluid is adapted to flow and formed with a transverse bore extending through said housing and across said longitudinal bore; annular sealing means located in said transverse bore of said housing on one side of the axis of said transverse bore and in a position surrounding and substantially coaxial with said longitudinal bore; and a valve member turnable in said transverse bore of said housing about a transverse turning axis, said valve member having a passage aligned with said longitudinal bore when said valve member is in an open position and extending across said longitudinal bore when said valve member is turned about said transverse turning axis to a closed position, said valve member having an outer convexly curved surface portion forming part of a sphere and engaging said sealing means when said valve member is in said open and closed positions thereof, and said valve member having a flat surface portion directed toward said sealing means when said valve member is turned about said transverse turning axis to a third position located beyond said open and closed positions thereof so that said valve member may be removed from said housing in the direction of said transverse turning axis when said valve member is in said third position thereof, said valve member having on opposite sides of said passage thereof, respectively, a pair of cylindrical projections coaxial with said transverse bore and in slidable engagement with said housing in said transverse bore thereof, one of said projections being threadedly connected to said valve member so as to be removable therefrom.

8. A valve comprising, in combination, an elongated valve housing formed with a longitudinal bore through which a fluid is adapted to flow, said valve housing also being formed with a smooth, cylindrical transverse bore extending perpendicularly across said longitudinal bore through said housing; annular sealing means located in said transverse bore on one side of the axis thereof in a position surrounding and substantially coaxial with said longitudinal bore; and a valve member turnable in said transverse bore of said housing about a transverse turning axis, said valve member having a convexly curved surface portion engaging said sealing means, said valve member being formed with a passage aligned with said longitudinal bore when said valve member is in an open position thereof and extending across said longitudinal bore when said valve member is turned about said transverse turning axis to a closed position thereof, and said convexly curved surface portion of said valve member engaging said sealing means when said valve member is in said open and closed positions thereof, and said valve member having a flat surface portion directed towards said sealing means when said valve member is turned about said transverse turning axis to a third position located beyond said open and closed positions thereof so that said valve member may be removed from said housing is the direction of said transverse turning axis when said valve member is in said third position thereof.

9. A valve comprising, in combination, an elongated valve housing formed with a longitudinal bore through which a fluid is adapted to flow, and also formed with a transverse bore extending through said housing across said longitudinal bore thereof; annular sealing means located in said transverse bore of said housing on one side of the axis of said transverse bore in a position surrounding and substantially coaxial with said longitudinal bore; a valve member located in said transverse bore and being turnable therein about a transverse turning axis, said value member being formed with a passage which is aligned with said longitudinal bore when said valve member is in an open position thereof and which extends across said longitudinal bore when said valve member is turned about said transverse turning axis to a closed position thereof, said valve member having a convexly curved outer surface portion engaging said sealing means when said valve member is in said open and closed positions thereof and said valve member having a second surface portion of substantially less curvature than said convexly curved surface portion thereof directed toward said sealing means when said valve member is turned about said transverse turning axis to a third position located beyond said open and closed positions thereof, said valve member having a pair of cylindrical projections respectively located on opposite sides of said passage thereof and respectively coaxial with said transverse bore; and a pair of annular cover members respectively connected to said housing at the opposite ends of said transverse bore and respectively guiding said valve member at said cylindrical portions thereof for turning movement between said positions of said valve member, at least one of said annular cover members being removably connected to said housing so that when said one cover member is removed and said valve member is in said third position thereof said valve member may be removed from said housing in the direction of said transverse turning axis.

10. A valve comprising, in combination, an elongated valve housing formed with a longitudinal bore through which a fluid is adapted to flow and formed with a transverse bore extending through said housing across said longitudinal bore thereof; annular sealing means located in said transverse bore on one side of the axis thereof in a position substantially coaxial with said longitudinal bore; a pair of annular cover members respectively closing opposite ends of said transverse bore, at least one of said cover members being removably connected to said housing; and a valve member turnable in said transverse bore about a transverse turning axis, said valve member having a pair of cylindrical portions coaxial with said transverse bore and guided for turning movement by said annular covers, said valve member having a passage aligned with said longitudinal bore when said valve member is in an open position and extending across said longitudinal bore when said valve member is turned about said transverse turning axis to a closed position, and said valve member having a convexly curved outer surface portion engaging said sealing means when said valve member is in said open and closed positions thereof, said valve member having an additional surface portion of substantially less curvature than said convexly curved surface portion directed toward said sealing means when said valve member is turned about said transverse turning axis to a third position located beyond said open and closed positions thereof so that said valve member may be removed from said housing in the direction of said transverse turning axis after said one annular cover member is removed and when said valve member is in said third position thereof, said valve member having a pair of annular surface portions respectively surrounding said cylindrical portions thereof and respectively slidably engaging said annular cover members at faces of the latter which are directed toward the interior of said transverse bore.

11. A valve comprising, in combination, an elongated valve housing formed with a longitudinal bore through which a fluid is adapted to flow and formed with a transverse bore extending through said housing across said longitudinal bore thereof; annular sealing means located in said transverse bore on one side of the axis thereof in a position substantially coaxial with said longitudinal bore; a pair of annular cover members respectively closing opposite ends of said transverse bore, at least one of said cover members being removably connected to said housing; a valve member turnable in said tranverse bore about a transverse turning axis, said valve member having a pair of cylindrical portions coaxial with said transverse bore and guided for turning movement by said annular covers, said valve member having a passage aligned with said longitudinal bore when said valve member is in an open position and extending across said longitudinal bore when said valve member is turned about said transverse turning axis to a closed position, and said valve member having a convexly curved outer surface portion engaging said sealing means when said valve member is in said open and closed positions thereof, said valve member having an additional surface portion of substantially less curvature than said convexly curved surface portion directed toward said sealing means when said valve member is turned about said transverse turning axis to a third position located beyond said open and closed positions thereof so that said valve member may be removed from said housing in the direction of said transverse turning axis after said one annular cover member is removed and when said valve member is in said third position thereof, said valve member having a pair of annular surface portions respectively surrounding said cylindrical portions thereof and respectively slidably engaging said annular cover members at faces of the latter which are directed toward the interior of said transverse bore; and sealing means located at said annular surface portions of said valve member which slidably engage said cover members, respectively.

12. A valve comprising, in combination, an elongated valve housing formed with a longitudinal bore through which a fluid is adapted to flow and formed with a transverse bore extending through said housing across said longitudinal bore thereof; annular sealing means located in said transverse bore of said housing on one side of the axis of said transverse bore in a position surrounding and substantially coaxial with said longitudinal bore; a pair of annular cover members connected to said housing at opposite ends of said transverse bore thereof, respectively, at least one of said cover members being removably connected to said housing; a valve member having a pair of cylindrical projections respectively extending through said annular cover members so as to mount said valve member for turning movement about a transverse turning axis, said valve member having a passage aligned with said longitudinal bore when said valve member is in an open position and extending across said longitudinal bore when said valve member is turned about said transverse turning axis to a closed position, said valve member having a convexly curved outer surface portion engaging said sealing means when said valve member is in said open and closed positions thereof and having a surface portion of substantially less curvature than said convexly curved surface portion directed toward said sealing means when said valve member is turned about said transverse turning axis to a third position located beyond said open and closed positions thereof, so that when said valve member is in said third position and said one of said cover members is removed said valve member may be removed from said housing in the direction of said transverse turning axis; and roller bearing means carried by said annular cover members and respectively engaging said cylindrical portions of said valve member for guiding said valve member for turning movement about the axis of said transverse bore.

13. A valve comprising, in combination, an elongated valve housing formed with a longitudinal bore through which a fluid is adapted to flow and formed with a transverse bore extending through said housing transversely across said longitudinal bore; annular sealing means located in said transverse bore of said housing on one side of the axis of said transverse bore in a position surrounding and substantially coaxial with said longitudinal bore; a valve member turnable in said transverse bore of said housing about a transverse turning axis, said valve member having a passage aligned with said longitudinal bore when said valve member is in an open position and extending across said longitudinal bore when said valve member is turned about said transverse turning axis to a closed position, said valve member having a convexly curved outer surface portion engaging said sealing means when said valve member is in said open and closed positions thereof and having a surface portion of substantially less curvature than said convexly curved surface portion directed toward said sealing means when said valve member is turned about said transverse turning axis to a third position thereof so that said valve member may be removed from said housing in the direction of said transverse turning axis when said valve member is in said third position thereof; and stop means operatively connected to said valve member and housing for limiting the turning movement of said valve member to a movement between said open and closed positions thereof, said stop means having a portion movable from an operating position where it limits the movement of said valve member so that when said portion of said stop means is out of its operating position said valve member may be turned to said third position thereof.

14. A valve comprising, in combination, an elongated valve housing formed with a longitudinal bore through which a fluid is adapted to flow and formed with a transverse bore extending through said housing transversely across said longitudinal bore; annular sealing means located in said transverse bore of said housing on one side of the axis of said transverse bore in a position surrounding and substantially coaxial with said longitudinal bore; a valve member turnable in said transverse bore of said housing about a transverse turning axis, said valve member having a passage aligned with said longitudinal bore when said valve member is in an open position and extending across said longitudinal bore when said valve member is turned about said transverse turning axis to a closed position, said valve member having a convexly curved outer surface portion engaging said sealing means when said valve member is in said open and closed positions thereof and having a surface portion of substantially less curvature than said convexly curved surface portion directed toward said sealing means when said valve member is turned about said transverse turning axis to a third position thereof so that said valve member may be removed from said housing in the direction of said transverse turning axis when said valve member is in said third position thereof; a first stop member fixed to said valve member for turning movement therewith and being in the form of a ring formed with a cutout extending through an angle substantially equal to the angle through which said valve member turns between its open and closed positions; and a second stop member fixed to said housing and located in said cutout of said first stop member for cooperating with the latter to limit the turning of said valve member to movement between its open and closed positions, at least one of said stop members being removable so that when it is removed said valve member may be turned to said third position thereof.

15. A valve comprising, in combination, an elongated, one-piece valve housing formed with a longitudinal bore through which a fluid is adapted to flow and formed with a transverse bore extending across said longitudinal bore and through said housing, said housing being formed in said transverse bore thereof with a pair of annular, inner and outer cylindrical guide surfaces coaxial with said longitudinal bore, said housing having an annular third surface extending between said guide surfaces and located in a plane normal to the axis of said longitudinal bore; an annular sealing means located in said transverse bore of said housing and having a pair of annular guide surfaces respectively in slidable engagement with said annular guide surfaces of said housing so that said sealing member is guided for movement in a direction parallel to the axis of said longitudinal bore, said sealing member having a third annular surface extending between said guide surfaces thereof, located in a plane normal to the axis of said longitudinal bore, and spaced from and directed toward said third surface of said housing so that an annular hollow chamber is formed between said third surfaces of said sealing member and housing; and a valve member turnably located in said transverse bore for turning movement about a transverse turning axis, said valve member having a passage aligned with said longitudinal bore when said valve member is in an open position and extending across said longitudinal bore when said valve member is turned about said transverse turning axis to a closed position, and said valve member having a convexly curved surface portion engaging said sealing member when said valve member is in its open and closed positions, said valve member having an additional surface portion of substantially less curvature than said convexly curved surface portion directed toward said sealing member when said valve member is turned about said transverse turning axis to a third position located beyond said open and closed positions thereof, so that said valve member may be removed from said housing in the direction of said transverse turning axis when said valve member is in said third position thereof.

16. A valve comprising, in combination, an elongated, one-piece valve housing formed with a longitudinal bore through which a fluid is adapted to flow and formed with a transverse bore extending across said longitudinal bore and through said housing, said housing being formed in said transverse bore thereof with a pair of annular, inner and outer cylindrical guide surfaces coaxial with said longitudinal bore, said housing having an annular third surface extending between said guide surfaces and located in a plane normal to the axis of said longitudinal bore; an annular sealing means located in said transverse bore of said housing and having a pair of annular guide surfaces respectively in slidable engagement with said annular guide surfaces of said housing so that said sealing member is guided for movement in a direction parallel to the axis of said longitudinal bore, said sealing member having a third annular surface extending between said guide surfaces thereof, located in a plane normal to the axis of said longitudinal bore, and spaced from and directed toward said third surface of said housing so that an annular hollow chamber is formed between said third surfaces of said sealing member and housing; a valve member turnably located in said transverse bore for turning movement about a transverse turning axis, said valve member having a passage aligned with said longitudinal bore when said valve member is in an open position and extending across said longitudinal bore when said valve member is turned about said transverse turning axis to a closed position, and said valve member having a convexly curved portion engaging said sealing member when said valve member is in its open and closed positions, said valve member having an additional surface portion of substantially less curvature than said convexly curved surface portion directed toward said sealing member when said valve member is turned about said transverse turning axis to a third position located beyond said open and closed positions thereof, so that said valve member may be removed from said housing in the direction of said transverse turning axis when said valve member is in said third position thereof; and a sealing ring of a compressible elastic material located in said annular hollow chamber and being compressed between said third surfaces, said sealing ring having in its unstressed condition a circular cross section of a diameter greater than the distance between said third surfaces and said sealing ring having in its unstressed condition a circular configuration of a diameter substantially midway between the diameters of the inner and outer guide surfaces of said housing.

17. A valve comprising, in combination, an elongated valve housing formed with a longitudinal bore through which a fluid is adapted to flow and formed with a transverse bore extending through said valve housing transversely across said longitudinal bore; annular sealing means located in said housing on one side of the axis of said transverse bore in a position surrounding and coaxial with said longitudinal bore of said housing; and an elongated valve member turnable in said transverse bore of said housing about a transverse turning axis, said valve member being formed with a passage which is aligned with said longitudinal bore when said valve member is in an open position and which extends across said longitudinal bore when said valve member is turned about said transverse turning axis to a closed position, said valve member having an outer convexly curved surface portion engaging said sealing means when said valve member is in said open and closed positions, and said valve member having a face portion of substantially less curvature than said convexly curved portion thereof, said face portion being arranged transversely to a plane normal to said transverse turning axis and being so located that when said valve member is turned about said transverse turning axis to a third position located beyond said open and closed positions, said face portion is directed toward said sealing means, whereby when said valve member is in said third position thereof it may be removed from said housing in the direction of said transverse turning axis.

18. A valve comprising, in combination, an elongated valve housing formed with a longitudinal bore through which a fluid is adapted to flow and formed with a transverse bore extending through said valve housing transversely across said longitudinal bore; annular sealing means located in said housing on one side of the axis of said transverse bore in a position surrounding and coaxial with said longitudinal bore of said housing; and an elongated valve member turnable in said transverse bore of said housing about a transverse turning axis, said valve member being formed with a passage which is aligned with said longitudinal bore when said valve member is in an open position and which extends across said longitudinal bore when said valve member is turned about said transverse turning axis to a closed position, said valve member having an outer convexly curved surface portion engaging said sealing means when said valve member is in said open and closed positions, and said valve member having a substantially flat surface portion lying in a plane normal to a plane normal to said transverse turning axis, said substantially flat surface portion being so located that when said valve member is turned about said transverse turning axis to a third position located beyond said open and closed positions, said substantially flat surface portion is directed toward said sealing means, whereby when said valve member is in said third position thereof it may be removed from said housing in the direction of said transverse turning axis.

References Cited in the file of this patent

UNITED STATES PATENTS

| 2,109,042 | Bennett | Feb. 22, 1938 |
| 2,333,424 | Humphreys | Nov. 2, 1943 |
| 2,471,725 | Clifford | May 31, 1949 |
| 2,578,396 | Brown | Dec. 11, 1951 |
| 2,628,060 | Parker | Feb. 10, 1953 |
| 2,628,809 | Mikeska | Feb. 17, 1953 |

FOREIGN PATENTS

| 536,016 | Great Britain | Apr. 30, 1941 |
| 739,290 | Germany | Sept. 18, 1943 |
| 716,610 | Great Britain | Oct. 13, 1954 |